Jan. 18, 1949.   J. J. STERNAD   2,459,249
TRICYCLE CART
Filed Aug. 16, 1947
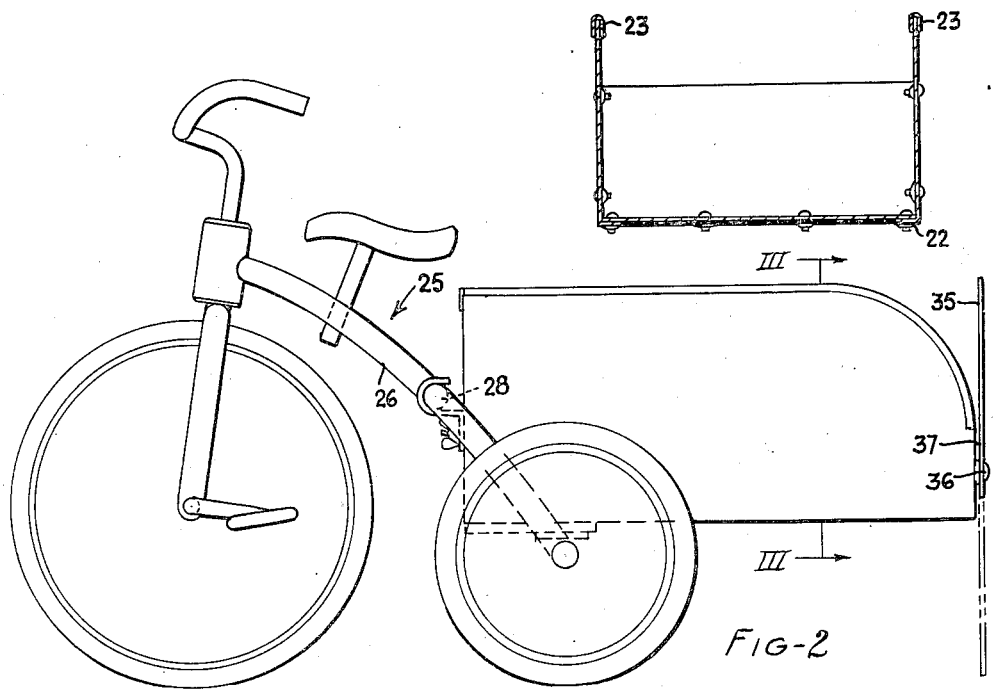
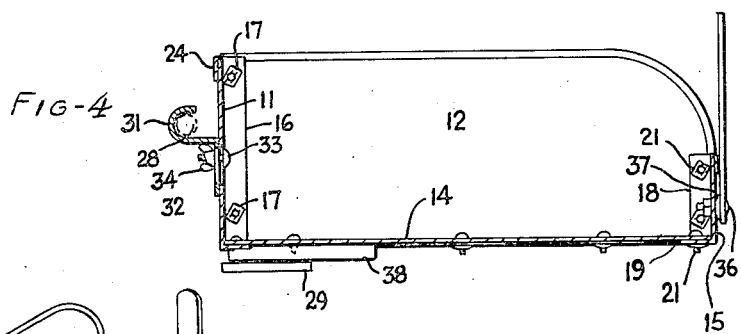
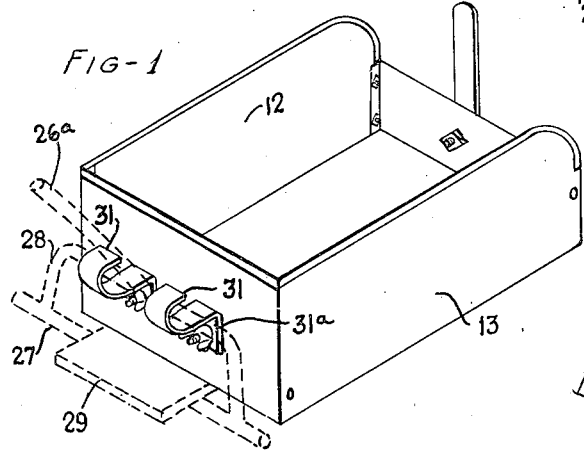
INVENTOR
Joseph J. Sternad
BY West & Oldham
ATTORNEYS Patented Jan. 18, 1949

2,459,249

UNITED STATES PATENT OFFICE 2,459,249

TRICYCLE CART

Joseph J. Sternad, Cleveland, Ohio

Application August 16, 1947, Serial No. 768,971

2 Claims. (Cl. 280—202)

This invention relates to detachable carts or parcel receptacles, especially to a detachable cart which is adapted for engagement with a tricycle so as to be completely supported thereby. Heretofore various types of carts have been provided for engagement with tricylcles but all of these carts known to me have been relatively large and have required individual support wheels secured to at least one portion of the cart. Hence these previous types of carts provided have been relatively heavy, expensive and have not been easily pulled by a tricycle. Furthermore, some of the carts have made it very difficult to go up and down curbs when such cart is engaged with a tricycle.

The general object of the present invention is to avoid and overcome the foregoing and other disadvantages of tricycle carts and to provide a cart for a tricycle which cart is characterized by its ready engagement with and complete support by a tricycle.

Another object of the invention is to provide a light weight but sturdy cart that is adapted to be engaged with any of a variety of sizes of tricycles.

Another object of the invention is to provide a cart which protrudes from the rear portion of a tricycle and which is provided with a removable support arm adapted for supporting the cart when the tricycle is stationary.

Another object of the invention is to provide an attractive, light weight cart which can be readily attached to a tricycle and serve as a toy for the child using the tricycle.

The foregoing and other objects and advantages of the invention will be made apparent as this specification proceeds.

Attention now is directed to the accompanying drawings wherein:

Fig. 1 is a perspective of a cart embodying the principles of the invention with a portion of a tricycle frame being indicated engaged therewith;

Fig. 2 is a side elevation of the cart of Fig. 1 engaged with the tricycle;

Fig. 3 is a vertical transverse section taken on the line III—III of Fig. 2; and Fig. 4 is a longitudinal section of the cart of the invention with a portion of the tricycle being indicated associated therewith.

Referring to the details shown in the drawings, a cart 10 is provided which is adapted for ready engagement with and support by a conventional tricycle frame. The cart 10 normally is formed from light weight sheet metal and may be made from a plurality of sections, in this instance, a front section 11, side sections 12 and 13, bottom section 14 and a rear section 15. These sections 11 through 15 can be secured together in any desired manner, and may have flange portions extending therefrom to facilitate engagement with the associated sheet metal section. Fig. 4 of the drawing clearly shows that a rearwardly extending flange 16 is provided on the front section 11 and that bolts 17 extend through such flange 16 and the side section 12 to engage same. A similar flange 18 extends forwardly from each lateral edge of the rear section 15 and a base flange 19 also extends therefrom for association with the under surface of the base 14 whereby bolts 21 may engage the sections together. An inwardly extending flange 22 is formed at the lower edge of each of the side sections 12 and 13 to enable them to be secured to the base 14. As indicated above, any desired type of bolts may be used to secure the sections of the cart 10 together. In some instances it may be desirable to form the sides and bottom of the cart from one integral piece of material, or possibly the entire cart could be made from one piece of sheet metal with certain portions being bent upwardly with relation to the base section to permit their formation into the cart 10. Still another possibility would be to form the front and rear ends integral with the base portion of the cart and have separate side sheets secured thereto.

Figs. 3 and 4 indicate that reinforcing beads 23 may be provided on the supper surfaces of the sides 12 and 13 and that a similar reinforcing bead 24 may be formed integrally with the upper edge of the front section 11.

The cart 10 of the invention is adapted to be removably associated with a tricycle 25 of standard construction. The tricycle 25 is provided with a frame 26 that has a rear axle 27 secured thereto with an elevated brace portion 28 of the frame bridging over the major portion of the axle 27, as is standard in nearly all tricycle construction. The section 26a of the frame extends upwardly from the brace 28 to connect the rear portion of the tricycle to the remainder thereof. Usually a step bracket 29 is secured to the axle 27 underneath the brace 28 and this step bracket 29 is engaged in any conventional manner to the axle 27.

As a feature of the invention, the cart 10 is provided with a pair of upwardly open hook elements 31 each of which has a substantially vertically extending foot portion 31a adapted to abut against the forward surface of the front section 11. The foot sections 31ª of the hook elements are provided with vertically extending slots 32 formed therein and conventional means, such as a bolt 33 having a wing nut 34 thereon extends through the front section 11 and the slot 32 for adjustably securing the hook elements 31 to the remainder of the cart. Hence the relationship between the hook elements 31 and the remainder of the cart can be varied to adapt the cart for engagement with varying sizes of tricycles. The cart 10 is adapted to seat on the step bracket 29 and be retained in such position by the hook elements 31 engagement with the upper portion of the brace 28 on opposite sides of the frame member 26ª. Hence the frame member 26ª prevents sidewise movement of the cart on the tricycle, as the hook elements can be positioned in immediately associated relationship therewith, if desired.

Another feature of the invention is that a support arm 35 is provided at the rear end of the cart. This support arm is releasably secured to the rest of the cart by the bolt 36 which may have a wing nut (not shown) or an ordinary nut associated therewith. A lock washer 37 is carried by the bolt 36 to aid in retaining the support arm 35 in a given position. As shown in Fig. 2, the support arm 35 protrudes up beyond the upper edge of the rear section 15 when the support arm is in its vertically upward position whereas the support arm can be made to extend vertically downwardly from the rear of the cart and will form a rear support for the cart when it is being loaded or at any time when the tricycle is stationary. Usually, the support arm should be in its downward position when the cart is being loaded and then be moved up to its vertically extended position when the tricycle is being ridden. The weight of the tricycle 25 is usually enough to retain an unloaded cart in a position protruding from the tricycle. However, when the cart is loaded, it may be necessary to have a rider on the tricycle to prevent the loaded cart from raising the front end of the tricycle into the air.

From the foregoing, it will be seen that a light weight, attractive cart is provided by the invention and that a child can easily engage the cart 10 with the tricycle. All that is required to engage the cart with the tricycle is to release the hook elements 31 from tight engagement with the front section 11 of the cart, thread the hooks into engagement with the brace 28, and then tighten the wing nuts 34 so as to lock the hooks in position and prevent undesired disengagement of the hooks and brace. In some instances it may be desirable to make the hook elements 31 of such size that they would not require being loosened when engaging and disengaging them with relation to the brace 28.

As shown in Fig. 3, it may be desirable to have blocks 38 associated with the under surface of the cart to engage the cart with the step bracket 29 of the tricycle. However, in some instances these blocks are not required and the cart may rest directly upon the step bracket. Use of the block 38 which may be made from wood or resilient material, prevents a metal-to-metal contact between the cart and tricycle. The rear portions of the cart are of curved contour to form a more attractive structure. Of course, the cart can be painted in any desired manner to enhance the appearance of the same. While the cart is very attractive to a child in that he can play with his tricycle and consider it a truck, the invention also is adapted to serve a useful purpose in that the cart can carry groceries or other parcels therein.

While one complete embodiment of the invention has been disclosed herein, it will be appreciated that modification of this particular embodiment of the invention may be resorted to without departing from the scope of the invention as defined by the appended claims.

The tricycle may not have an actual step plate on its rear axle but the axle will in all events function as a step and a partial support for the cart. By pivotally attaching the cart to the tricycle, the cart can be lifted, if necessary, to permit the tricycle to go up or down curbs.

The cart can be used in connection with other structures, such as a two-wheeled bicycle, and be secured thereto by the hooks 31 which might engage the handlebars, or be attached to the bottom section 14 for engagement with a support rack on the bicycle. The word "cart" in this specification is taken to mean a load-carrying receptacle in the form of an attachment adapted to be secured to a vehicle.

Having thus described my invention, what I claim is:

1. An attachment adapted to be removably attached to a tricycle having a frame including an elevated brace and a step below the brace at the rear of the tricycle, which attachment comprises a box-like member having an open top, a pair of upwardly open hook elements adapted to engage with said brace member and having vertically extending sections adapted to abut on the front end of said member, said hook elements having vertically extending slots formed in the vertical sections thereof, and means releasably engaging with said slots and hook elements to position said hook elements in adjustable relation to the box-like member.

2. An attachment adapted to be removably attached to a vehicle support, said attachment comprising a box-like member having an open upper surface, a pair of hook elements having portions abutted on said member and portions spaced therefrom for engagement with a support, said abutted portions having elongated slots formed therein, and means extending through said slots to secure said hook elements to said member in adjustable relation thereto.

JOSEPH J. STERNAD.

REFERENCES CITED

The following references are of record in the file of this patent:

UNITED STATES PATENTS

| Number | Name | Date |
|---|---|---|
| 1,285,930 | Cadman | Nov. 26, 1918 |
| 1,818,658 | Thompson | Aug. 11, 1931 |